(12) United States Patent
Weigel

(10) Patent No.: US 7,498,763 B2
(45) Date of Patent: Mar. 3, 2009

(54) APPARATUS AND METHOD FOR REDUCING THE CURRENT DRAWN DURING STARTING OF A SINGLE-PHASE AC ASYNCHRONOUS MOTOR

(76) Inventor: Roland Weigel, Kramenwies/Postfach, Neu St. Johann (CH) 9652

( * ) Notice: Subject to any disclaimer, the term of this patent is extended or adjusted under 35 U.S.C. 154(b) by 0 days.

(21) Appl. No.: 11/774,950

(22) Filed: Jul. 9, 2007

(65) Prior Publication Data

US 2007/0257632 A1    Nov. 8, 2007

Related U.S. Application Data

(63) Continuation of application No. 10/537,089, filed as application No. PCT/CH03/00797 on Dec. 2, 2003, now abandoned.

(30) Foreign Application Priority Data

Dec. 2, 2002    (CH) ..................................... 2028/02

(51) Int. Cl.
    *H02P 1/16* (2006.01)
(52) U.S. Cl. ....................... 318/778; 318/779; 318/788; 318/794
(58) Field of Classification Search .................. 318/778, 318/779, 788, 789, 794, 795
    See application file for complete search history.

(56) References Cited

U.S. PATENT DOCUMENTS

| 3,303,402 | A |   | 2/1967 | Martin |
| 3,737,752 | A | * | 6/1973 | Strachan ..................... 318/471 |
| 4,066,937 | A | * | 1/1978 | Pfarrer et al. ................ 318/775 |
| 4,751,450 | A | * | 6/1988 | Lorenz et al. ................ 318/786 |
| 5,212,436 | A | * | 5/1993 | Nacewicz et al. ........... 318/788 |
| 5,528,120 | A | * | 6/1996 | Brodetsky ..................... 318/785 |
| 5,617,001 | A | * | 4/1997 | Nacewicz et al. ........... 318/788 |
| 5,861,697 | A | * | 1/1999 | Sugita et al. ................ 310/166 |

FOREIGN PATENT DOCUMENTS

| DE | 2819154 | 11/1979 |
| DE | 3105444 | 7/1982 |
| EP | 0590592 | 4/1994 |
| FR | 2484729 | 6/1980 |
| GB | 2292847 | 3/1996 |

* cited by examiner

*Primary Examiner*—Rina I Duda
(74) *Attorney, Agent, or Firm*—Shoemaker and Mattare

(57) ABSTRACT

Current consumption during the starting process of a single-phase a.c. asynchronous motor is reduced by an apparatus including a thermistor which can be mounted in series with the main winding of the motor. A starting capacitor can be mounted in series with an auxiliary winding, and current and voltage peaks of the starting capacitor can be reduced by a posistor. The thermistor is mounted in series with the main winding at the beginning of the starting process, and can be bridged by a switch once the starting process is completed.

16 Claims, 4 Drawing Sheets

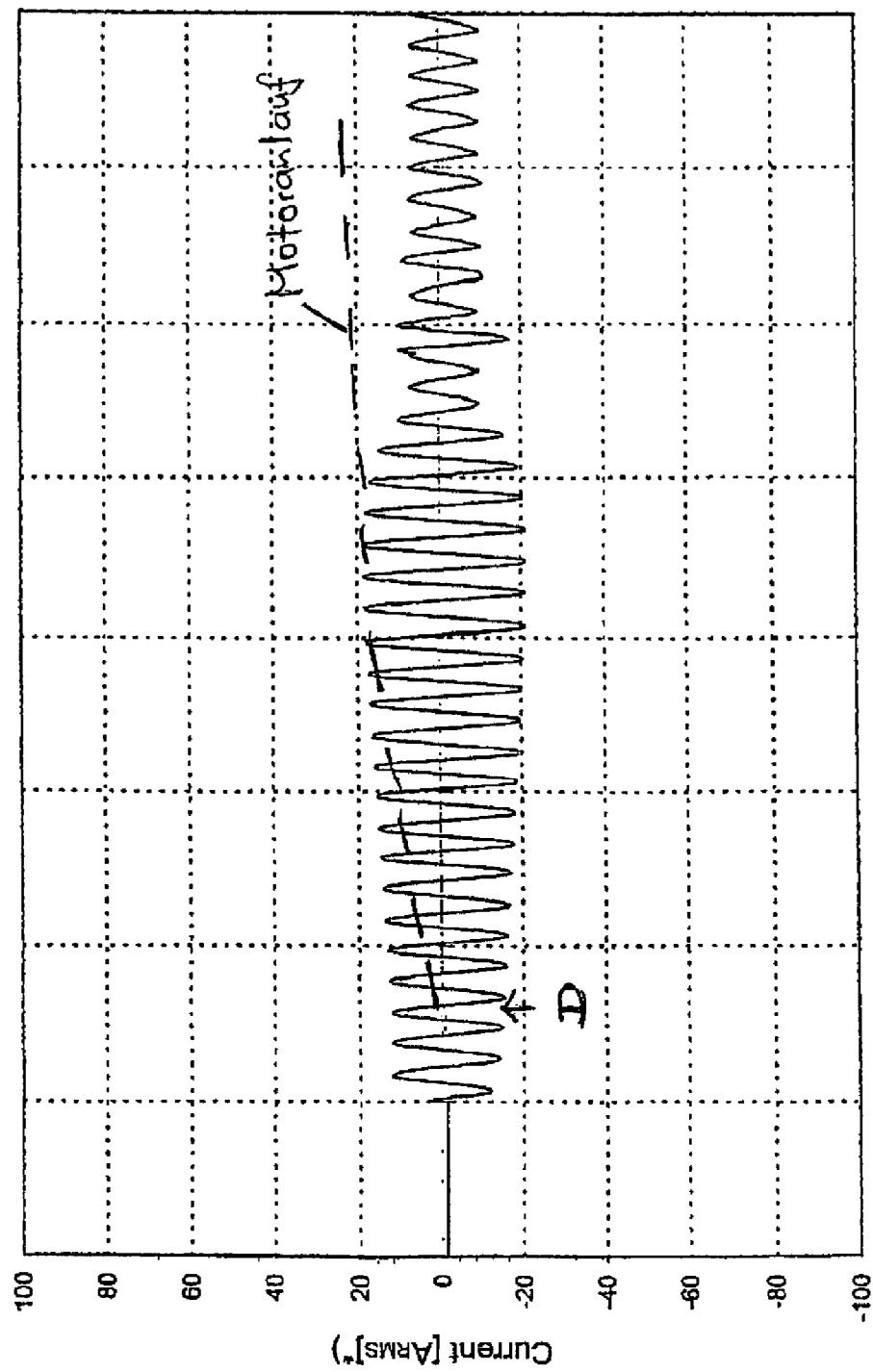

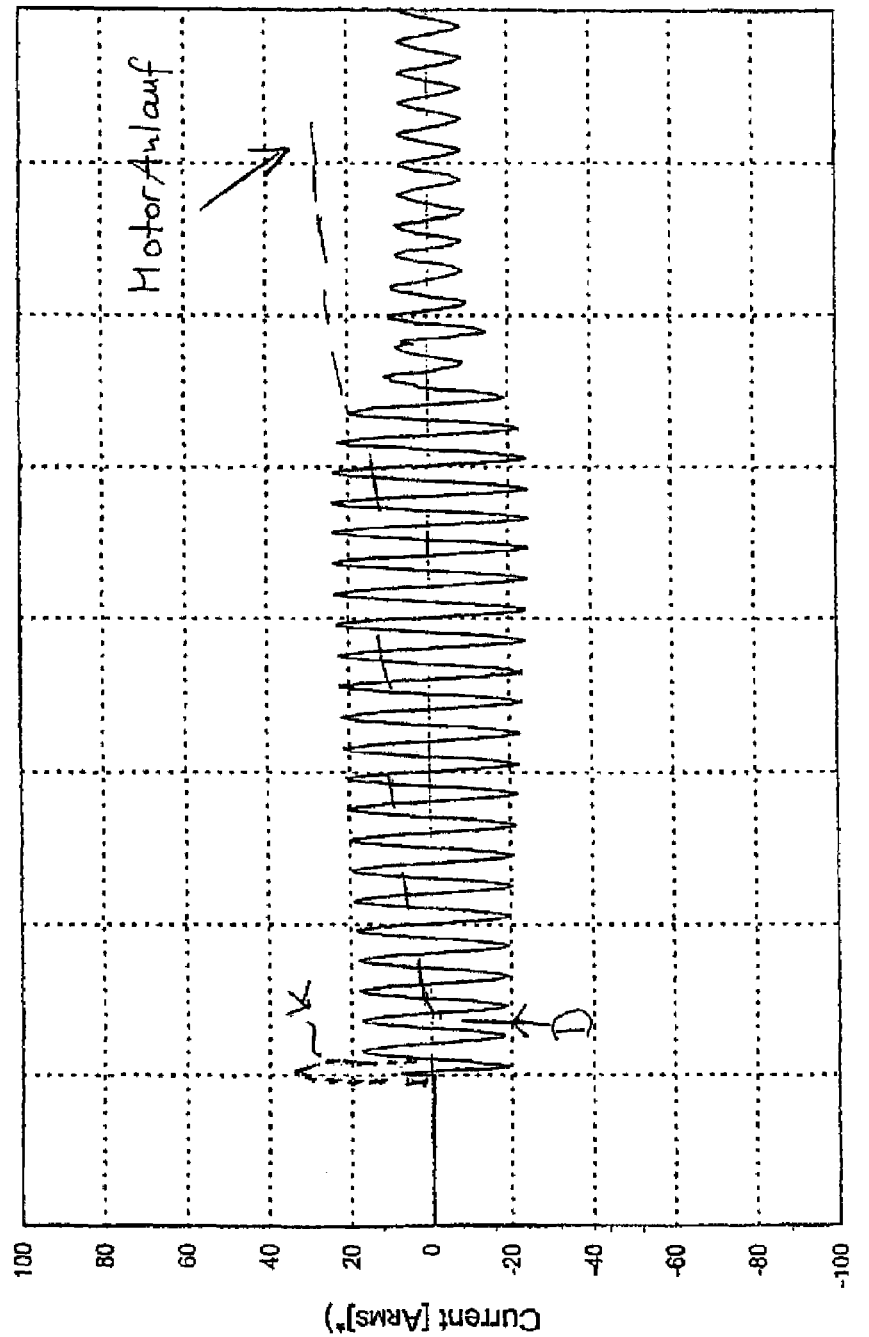

APPARATUS AND METHOD FOR REDUCING THE CURRENT DRAWN DURING STARTING OF A SINGLE-PHASE AC ASYNCHRONOUS MOTOR

This application is a continuation of application Ser. No. 10/537,089, filed Jun. 2, 2005.

BACKGROUND OF THE INVENTION

The invention relates to an apparatus and a method for reducing the current drawn while starting a single-phase AC asynchronous motor.

The limiting of the starting current of inductive or capacitive loads is a problem that has been known for a long time and whose solution has been aimed at in widely differing ways. An additional starting resistor is often used during the starting phase, and limits the current that is drawn. Similar measures are known during switching off, in order to avoid current surges or voltage spikes.

In addition to industrial users, a large number of private households load the public mains power supply system by drawing excessive currents for appliances such as refrigerators or air-conditioning systems. The compressors in appliances such as these are switched on and off frequently, so that the public mains power supply system is frequently loaded. This results in undesirable mains voltage fluctuations.

In order to reduce the starting current, motors have until now been used with a main and an auxiliary winding, with a capacitor being connected between the voltage source and the auxiliary winding. During the starting phase, the capacitor and the auxiliary winding were switched on by means of a relay, and were switched off once the starting phase had been completed. Apparatuses such as these have the disadvantage that switching the relay on and off results in unacceptable current surges.

DE 28 48 281 discloses a control apparatus for reducing the starting current, in which the main winding and auxiliary winding are initially entirely connected to the mains voltage in a first time period. The maximum current thus flows through the main winding and auxiliary winding. This leads not only to an undesirable switch-on current surge, but to the rotor being practically stalled by the maximum current in the rest state. Alternatively, it has also already been proposed for an NTC thermistor to be arranged in such a way that both the current through the main winding and the current through the auxiliary winding are reduced at the moment of switch-on. This on the one hand reduces the maximum current through the main winding, but also on the other hand limits the current through the auxiliary winding, thus making the starting behavior worse. In known arrangements, the NTC thermistor is bridged, and rendered ineffective, after the end of the starting process.

SUMMARY OF THE INVENTION

The invention is based on the object of avoiding the disadvantages of the known approach, that is to say in particular of providing an apparatus for limiting the current drawn while starting a single-phase AC asynchronous motor, in which on the one hand the starting current is reduced, and on the other hand the starting behavior is improved. One particular aim is to prevent an excessively high current through the main winding, and thus to avoid the rotor being stalled at rest. At the same time, a further aim is to increase the effect of the auxiliary winding, and to increase the starting torque.

According to the invention, this is achieved by an apparatus as described below.

The starting current of a single-phase AC motor can be limited according to the prior art by connecting an NTC thermistor upstream of the main winding and the auxiliary winding throughout the entire starting phase. A configuration such as this admittedly makes it possible to reduce the starting current, but individual current surges cannot be eliminated. Furthermore, this restricts the auxiliary winding field. It has now been found that the starting current can be effectively reduced by several times by connecting an NTC thermistor upstream of only the main winding of a single-phase AC motor during the starting phase, and by connecting a capacitor, which is connected directly to the voltage source, upstream of the auxiliary winding. It has been found that an arrangement in which the auxiliary winding is not connected to the voltage source via an NTC thermistor allows the starting current to be reduced, assuming that the individual components are appropriately designed, at least to one third of the current when the rotor is stalled.

If the starting capacitor is preceded by a PTC thermistor with an initial resistance in the cold state, even the capacitive current surges which occur through the starting capacitor during starting can be limited. The thermal characteristic of the PTC thermistor can in this case be chosen such that the resistance value of the PTC thermistor increases as it is heated up increasingly during the starting phase, thus considerably reducing the effect of the starting capacitor.

Alternatively, it is possible to connect an NTC thermistor upstream of the starting capacitor, thus limiting the capacitive current surges during starting very well. The heating of this NTC thermistor increases the current flow through the starting capacitor continuously.

From the start of the switching-on process, the NTC thermistor is connected in series with the main winding of the motor. The NTC thermistor is cool at the start of the starting phase and has a maximum resistance. Since current is flowing through the NTC thermistor, its temperature is increased, and its resistance decreases until a thermal equilibrium is continuously reached. Once the motor has reached the rated speed, the NTC thermistor is advantageously bridged by a circuit breaker or power switch, so that the current no longer flows through it. In consequence, the NTC thermistor can cool down, and can reach its original, maximum resistance. The cooling-down process results in the NTC thermistor being prepared for another switching-on process.

The PTC thermistor which is connected in series with the starting capacitor is also expediently switched off when the effect of the starting capacitor is no longer required. After this, the phase shift of the auxiliary winding with respect to the main winding is only produced by an operating capacitor. The operating capacitor may either be a component of the present apparatus, or else may be a part of the motor. Capacitors such as these are prior art and are generally also supplied by the motor manufacturer, are installed in the motor housing or in the connecting area, or are also supplied for external connection, or are specified in the operating instructions. The PTC thermistor is advantageously first of all disconnected from the circuit in the auxiliary winding, and only then is the NTC thermistor in the main winding bridged via a switch.

If an NTC thermistor, rather than a PTC thermistor, is connected upstream of the starting capacitor in the auxiliary winding this is switched off first of all when the motor reaches the rated speed. This prevents the current drawn in the starting capacitor from increasing rapidly. Secondly, the NTC thermistor is bridged in the main winding. The rated speed is normally reached when the rotor slip of the motor tends to zero.

The starting current can be minimized by the choice of a suitable capacitance, depending on the inductance of the main winding and auxiliary winding. In this case, an ideal value shall be observed for the capacitance.

In order to increase the phase shift between the main winding and auxiliary winding during starting, it is advantageous for the starting capacitor to be larger than the operating capacitor. The capacitance value of the starting capacitor is preferably two to five times as great, and preferably three to five times as great, as the operating capacitor.

Depending on the power consumption and the impedance value of the main winding, NTC thermistors have been proven which have a cold resistance of 10 to 30 O. Capacitance values of 35 to 50 µF have been proven as a capacitance value for the operating capacitor. Capacitance values between 80 and 150, and preferably around 100 µF, are used for the starting capacitor. In this case, in particular, a combination with these capacitances of cold resistances for the PTC thermistor of between 10 and 25 O, and preferably of between 15 and 20 O, have been particularly proven, in order to effectively limit the capacitive current surges through the starting capacitor at the moment of switching on.

The apparatus according to the invention preferably also has a control arrangement, which switches the switches on and off as a function of time.

The same arrangement can also be used for limiting current surges which can occur when the motor is switched off. On switching off, the NTC thermistor can effectively be connected in series, with the current supply to the motor then being interrupted.

BRIEF DESCRIPTION OF THE DRAWINGS

The invention will be explained in more detail in the following text using exemplary embodiments with reference to the drawing, in which:

FIGS. 2a to 2c show the current profile measured on the main winding (FIG. 2a), the auxiliary winding (FIG. 2b) and the overall current drawn (FIG. 2c) for a motor using the circuit arrangement illustrated in FIG. 1a.

DESCRIPTION OF THE PREFERRED EMBODIMENT(S)

Figure 1A:
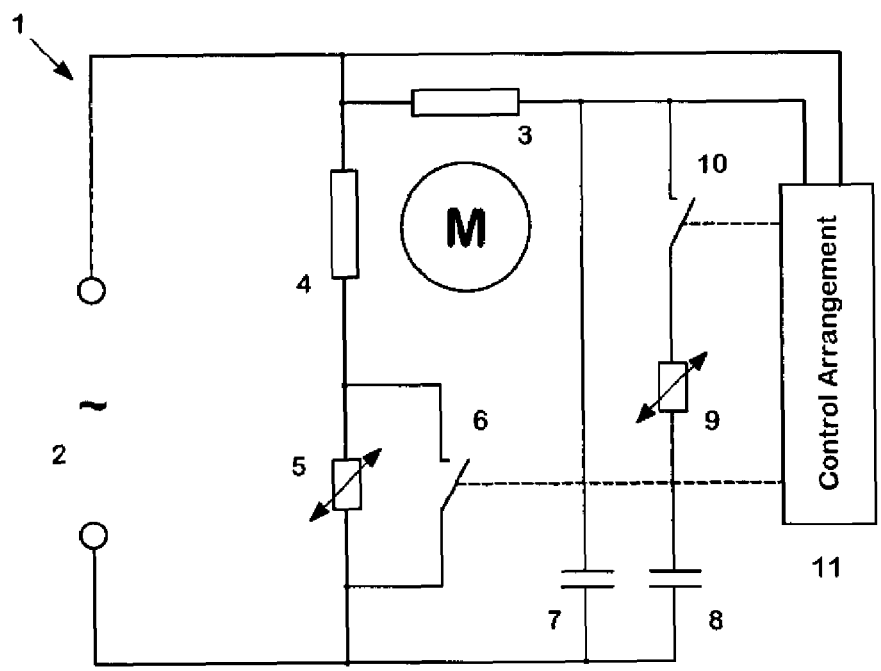
FIG. 1a shows a schematic illustration of a circuit arrangement having the features of the invention.

FIG. 1a shows, schematically, an apparatus 1 for reducing the current drawn by a single-phase AC asynchronous motor M having the features of the invention. The motor can be connected to a voltage source 2. The voltage source may, for example, be a domestic voltage supply with alternating current at about 230 or 110 volts. The motor M has an auxiliary winding 3 and a main winding 4, with the auxiliary winding 3 being connected in series with an operating capacitor 7 to the voltage source 2. The main winding is connected in series with an NTC thermistor 5 to the voltage source 2. A circuit breaker or power switch 6 is used to bridge the NTC thermistor 5 once the starting phase of the motor has been completed. This allows the NTC thermistor 5 to cool down. The auxiliary winding 3 and the main winding 4 of the NTC thermistor 5 preferably has a cold resistance of 10 to 30 O, in order to effectively reduce the starting current. In this case, two or more individual NTC thermistors are preferably connected in series. This allows the power consumed by a single NTC thermistor to be reduced, for example by connecting four to eight NTC thermistors of 2 or 4 O in series. The reduction in the current drawn and the production of a strong auxiliary field during the starting phase also depend on the size of the starting capacitor 8. Depending on the inductance of the main winding and the auxiliary winding, and the motor power during the starting phase, the optimum capacitance value differs. It has been proven for the starting capacitor 8 to in any case be greater than the operating capacitor 7. Its capacitance value is preferably at least twice, and preferably three to five times, that of the operating capacitor. In order to reduce capacitive current surges through the starting capacitor, it is expedient to connect a PTC thermistor 9 in series with the starting capacitor, to form a starting circuit. The cold resistance of the PTC thermistor is preferably between 15 and 50 O, and is preferably 25 to 35 O.

Figure 1B:
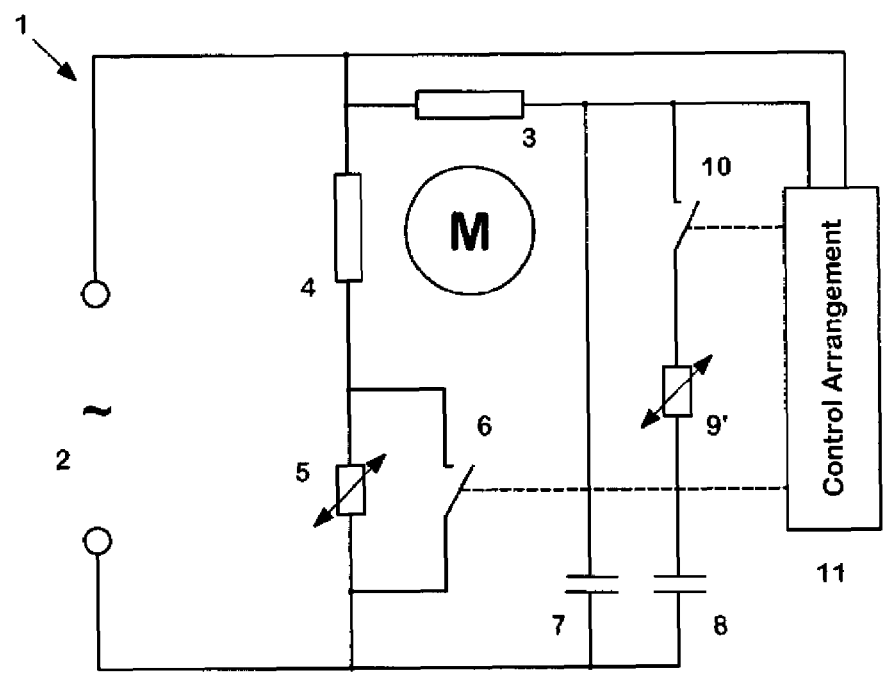
FIG. 1b shows a schematic illustration of an alternative circuit arrangement having the features of the invention.

As can be seen from FIG. 1b, the PTC thermistor 9 can be replaced by a further NTC thermistor 9'. This reduces the current to the starting capacitor 8 at the start of the switching-on phase. If the rotor slip tends to zero, the starting capacitor 8 and the NTC thermistor 9' connected upstream of it are disconnected from the circuit by the switch 10. The phase shift in the auxiliary winding is produced by the capacitor 7 from this time onward, whose capacitance value is around 3 to 5 times less than that of the starting capacitor 8. The NTC thermistor 5 is then bridged by the switch 6.

A control arrangement 11 is also preferably provided, and bridges not only the NTC thermistor in series with the main winding but also the starting circuit comprising the starting capacitor and the PTC thermistor at an appropriate time in the starting phase.

Figure 2B:
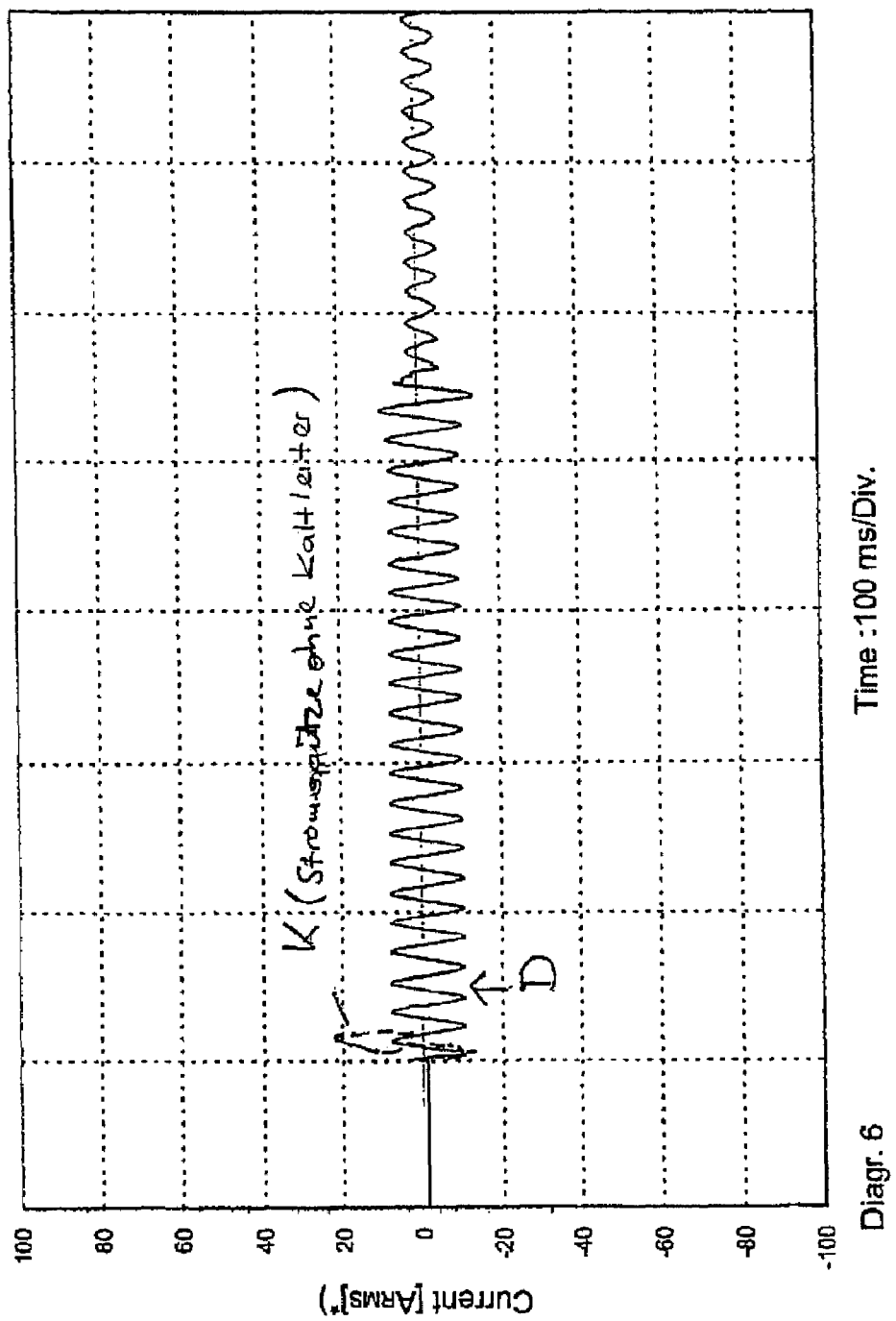

FIG. 2a shows the current profile at the connections 2 of the voltage source. In addition, the influence of the PTC thermistor 9 is indicated at "K", which reduces the capacitive current surges through the starting capacitor 8 at the moment of starting. FIG. 2b shows the current profile through the auxiliary winding 3. In this case as well, the figure shows the limiting of the capacitive current surges through the starting capacitor 8 by means of the initial resistance of the PTC thermistor 9 at "K".

FIG. 2c shows the current profile through the main winding 3. Throughout the entire switching-on phase, the current is effectively limited by the NTC thermistor 5. "D" indicates the point at which the rotor of the motor starts to rotate. "S" indicates the end of the switching-on phase. As can be seen from the curve profile, the current through the main winding 4 is effectively limited by the NTC thermistor 5 throughout the entire starting process. The resistance of the NTC thermistor 5 decreases continuously, while the resistance value of the main winding 4 and of the auxiliary winding 3 increases continuously as the starting process progresses. This ensures that the large current drawn during the switching-on phase including the current surges through the starting capacitors is reduced to an extent that prevents overloading of the mains supply systems. This also ensures that the motor is not stalled in the rest state as a result of an excessively large current being drawn. This makes it possible to avoid both the transient inrush currents which result from the magnetization/magnetization reversal process, which reach an amplitude of 20 times the value of the rated current during the duration of one half cycle.

It has been proven for the terminal voltage on the main winding to be about 10 to 20% at the time of switching on, as a result of the size of the NTC thermistor. The NTC thermistor is heated only by the flowing starting current, so that it decreases and allows the terminal voltage on the main winding to rise to about one third of the rated voltage. As the motor starts to accelerate to its rated speed, the rotor slip tends to zero, and the starting current changes to the operating current. The NTC thermistor can now be bridged.

In contrast, the auxiliary winding is connected at the time of switching on to the starting circuit that comprises, the PTC thermistor and starting capacitor. The PTC thermistor prevents current surges and reaction of the starting capacitor, by virtue of its cold resistance at the time of switching on.

Particularly in combination with the two limiting measures in the circuit of the main winding and auxiliary winding, this allows starting to be achieved on the one hand more easily and more quickly, while on the other hand avoiding current surges and negative reactions on the mains supply system.

I claim:

1. An apparatus for reducing current drawn during starting of a single-phase AC asynchronous motor having an auxiliary winding in a starting circuit and having a main winding, which apparatus has a main NTC thermistor connected in series with only the main winding, the NTC thermistor being in series with the main winding during starting in order to limit the starting current through the main winding, the main NTC thermistor not being in the starting circuit and not limiting starting current through the auxiliary winding.

2. The apparatus as claimed in claim 1, wherein said starting circuit has a starting capacitor in series with the auxiliary winding for producing a phase shift in the auxiliary winding, and a PTC thermistor for limiting capacitive current surges through the starting capacitor, wherein the starting circuit is in series with the starting capacitor and the starting circuit is in series with the auxiliary winding.

3. The apparatus as claimed in claim 1, wherein said starting circuit has a starting capacitor in series with the auxiliary winding for producing a phase shift in the auxiliary winding, and a starting NTC thermistor for limiting capacitive current surges through the starting capacitor and the starting circuit is in series with the auxiliary winding.

4. The apparatus as claimed in claim 1, further comprising a circuit breaker switch bridging the main NTC thermistor for deactivating the main NTC thermistor after starting.

5. The apparatus as claimed in claim 1, further comprising a circuit breaker switch in series with the auxiliary winding and adapted to switch off the starting circuit.

6. The apparatus as claimed in claim 1, further comprising a control arrangement for switching the main circuit breaker switch and the starting circuit breaker switch on and off as a function of time.

7. The apparatus as claimed in claim 6, wherein the control arrangement operates the starting circuit breaker switch in order to switch off the starting circuit before it operates the main circuit breaker switch in order to bridge the main NTC thermistor.

8. The apparatus as claimed in claim 2, further comprising an operating capacitor for producing a phase shift in the auxiliary winding with respect to the main winding in the operating state, wherein the capacitance of the starting capacitor is greater than the capacitance of the operating capacitor.

9. The apparatus as claimed in claim 2, wherein the capacitance value of the starting capacitor is at least twice as great as the capacitance value of the operating capacitor.

10. The apparatus as claimed in claim 1, wherein the main NTC thermistor has a cold resistance of 10 to 30Ω.

11. An apparatus as claimed in claim 9, wherein the capacitance value of the starting capacitor is three to five times as great as the capacitance value of the operating capacitor.

12. A method for reducing the starting current on switching on a single-phase AC asynchronous motor, said method comprising steps of, reducing, on switching on, the current through the main winding of the motor by means of a main NTC thermistor in series with the main winding, and bridging the NTC thermistor by means of a main circuit breaker switch after starting of the motor.

13. The method as claimed in claim 12, comprising a further step of producing a starting phase shift in an auxiliary winding of the motor during the starting process with a starting capacitor, and reducing the current through the starting capacitor at the moment of being switched on with a resistor.

14. The method as claimed in claim 13, wherein the resistor and the starting capacitor are disconnected from the starting circuit by a starting circuit breaker switch on reaching rated operation, before the main NTC thermistor is bridged by means of the main circuit breaker switch.

15. The method as claimed in claim 12, wherein the current through the main winding is increased continuously during the starting process, while the current through the starting capacitor and the degree of phase shift produced by the starting capacitor are increasingly reduced.

16. A method as claimed in claim 12, wherein the bridging step is done on or after reaching rated operation.

* * * * *